(12) United States Patent
Kosiorek et al.

(10) Patent No.: US 12,067,758 B2
(45) Date of Patent: Aug. 20, 2024

(54) OBJECT DISCOVERY IN IMAGES THROUGH CATEGORIZING OBJECT PARTS

(71) Applicant: Google LLC, Mountain View, CA (US)

(72) Inventors: Adam Roman Kosiorek, Oxford (GB); Geoffrey E. Hinton, Toronto (CA); Sara Sabour Rouh Aghdam, Toronto (CA); Yee Whye Teh, Oxford (GB)

(73) Assignee: Google LLC, Mountain View, CA (US)

( * ) Notice: Subject to any disclaimer, the term of this patent is extended or adjusted under 35 U.S.C. 154(b) by 445 days.

(21) Appl. No.: 17/613,767

(22) PCT Filed: May 22, 2020

(86) PCT No.: PCT/US2020/034386
§ 371 (c)(1),
(2) Date: Nov. 23, 2021

(87) PCT Pub. No.: WO2020/237215
PCT Pub. Date: Nov. 26, 2020

(65) Prior Publication Data
US 2022/0230425 A1 Jul. 21, 2022

Related U.S. Application Data

(60) Provisional application No. 62/852,293, filed on May 23, 2019, provisional application No. 62/864,390, filed on Jun. 20, 2019.

(51) Int. Cl.
*G06V 10/44* (2022.01)
*G06T 7/70* (2017.01)
*G06V 10/82* (2022.01)

(52) U.S. Cl.
CPC .............. *G06V 10/44* (2022.01); *G06T 7/70* (2017.01); *G06V 10/82* (2022.01); *G06T 2207/20081* (2013.01); *G06T 2207/20084* (2013.01)

(58) Field of Classification Search
CPC .. G06V 20/69; G06V 10/454; G06F 18/2155; G06F 18/24; G06N 3/084; G06N 3/045
See application file for complete search history.

(56) References Cited

U.S. PATENT DOCUMENTS 7,296,151 B2 * 11/2007 Artobello .............. G06F 21/604
713/168
8,892,495 B2 * 11/2014 Hoffberg .................. F24F 11/62
706/48

(Continued)

OTHER PUBLICATIONS

Ba et al., "Layer normalization," arXiv, Jul. 21, 2016, 14 pages.

(Continued)

*Primary Examiner* — Yosef Kassa
(74) *Attorney, Agent, or Firm* — Fish & Richardson P.C.

(57) ABSTRACT

Methods, systems, and apparatus, including computer programs encoded on computer storage media, for detecting objects in images. One of the methods includes obtaining an input image; processing the input image to generate predicted part feature data, the predicted part feature data comprising, for each of a plurality of possible object parts: a part presence probability representing a likelihood that the possible object part is depicted in the input image, a predicted pose of the possible object part in the input image given that the possible object part is depicted in the input image, and an object part feature vector characterizing the depiction of the possible object part given that the possible object part is depicted in the input image; and processing the predicted part feature data for the plurality of possible object parts to generate an object detection output that identifies one or more objects depicted in the input image.

20 Claims, 6 Drawing Sheets

(56) References Cited

U.S. PATENT DOCUMENTS

| | | | | |
|---|---|---|---|---|
| 9,194,968 | B2* | 11/2015 | Imhof | G01V 1/302 |
| 9,914,213 | B2* | 3/2018 | Vijayanarasimhan | |
| | | | | B25J 9/1697 |
| 10,303,979 | B2* | 5/2019 | Kraus | G06V 20/69 |
| 10,503,999 | B2* | 12/2019 | Rao | G08G 1/13 |

OTHER PUBLICATIONS

Bengio et al., "Greedy Layer-Wise Training of Deep Networks," Advances in Neural Information Processing Systems, Dec. 2007, 8 pages.

Burgess et al., "MONet: Unsupervised Scene Decomposition and Representation," arXiv, Jan. 22, 2019, 22 pages.

Cohen et al., "Group Equivariant Convolutional Networks," Proceedings of The 33rd International Conference on Machine Learning, Jun. 2016, 10 pages.

Cohen et al., "Steerable CNNs," Presented at International Conference on Representation Learning, Apr. 2017, 14 pages.

Dieleman et al., "Exploiting cyclic symmetry in convolutional neural networks," arXiv, May 26, 2016, 10 pages.

Duarte et al., "VideoCapsuleNet: A Simplified Network for Action Detection," Advances in Neural Information Processing Systems, Dec. 2018, 10 pages.

Eslami et al., "Attend, Infer, Repeat: Fast Scene Understanding with Generative Models," Advances in Neural Information Processing Systems, Dec. 2016, 9 pages.

Greff et al., "Multi-Object Representation Learning with Iterative Variational Inference," arXiv, May 15, 2019, 27 pages.

Gutmann et al., "Noise-contrastive estimation: A new estimation principle for unnormalized statistical models," Proceedings of the Thirteenth International Conference on Artifical Intelligence and Statistics, May 2010, pp. 297-304.

Hausser et al., "Associative Deep Clustering: Training a Classification Network with No Labels," German Conference on Pattern Recognition, Sep. 2019, pp. 18-32.

Hinton et al., "Matrix capsules with EM routing," Presented at Sixth International Conference on Learning Representations, Vancouver, Canada, Apr. 30-May 3, 2018, 15 pages.

Hinton et al., "Transforming Auto-Encoders," Artificial Neural Networks and Machine Learning—ICANN, May 31, 2011, pp. 44-51.

Hinton, "Some Demonstrations of the Effects of Structural Descriptions in Mental Imagery," Cognitive Science 3, Jul. 1979, 3(3):231-250.

Hjelm et al., "Learning deep representations by mutual information estimation and maximization," Presented at Seventh International Conference on Learning Representations, New Orleands, LA, May 6-9, 2019, 24 pages.

Hu et al., "Learning discrete representations via information maximizing self-augmented training," Learning Discrete Representations via Information Maximizing Self-Augmented Training, Aug. 2017, 10 pages.

International Preliminary Report on Patentability in International Appln. No. PCT/US2020/034386, dated Dec. 2, 2021, 10 pages.

International Search Report and Written Opinion in International Appln. No. PCT/US2020/034386, dated Sep. 14, 2020, 16 pages.

Jacobsen et al., "Dynamic Steerable Blocks in Deep Residual Networks," arXiv, Jul. 19, 2017, 13 pages.

Jaderberg et al., "Spatial Transformer Networks," arXiv, Dec. 3, 2015, 14 pages.

Jaiswal et al., "CapsuleGAN: Generative Adversarial Capsule Network," Proceedings of the European Conference on Computer Vision, Sep. 2018, 10 pages.

Ji et al., "Invariant Information Distillation for Unsupervised Image Segmentation and Clustering," arXiv, Jul. 21, 2018, 13 pages.

Kosiorek et al., "Sequential Attend, Infer, Repeat: Generative Modelling of Moving Objects," Advances in Neural Information Processing Systems, Dec. 2018, 11 pages.

Kuhn, "The Hungarian method for the assignment problem," Naval Research Logistics Quarterly, Mar. 1955, pp. 83-97.

LaLonde et al., "Capsules for object segmentation," arXiv, Apr. 11, 2018, 9 pages.

Lee et al. "Set Transformer: A Framework for Attention-based Permutation-Invariant Neural Networks," arXiv, Oct. 1, 2018, 16 pages.

Lenssen et al., "Group Equivariant Capsule Networks," Advances in Neural Information Processing Systems, Dec. 2018, 10 pages.

Li et al., "Neural Network Encapsulation," Proceedings of the European Conference on Computer Vision, Sep. 2018, pp. 252-267.

Liu et al., "Soft Rasterizer: Differentiable Rendering for Unsupervised Single-View Mesh Reconstruction," arXiv, Jan. 23, 2019, 10 pages.

Maddison et al., "The concrete distribution: A continuous relaxation of discrete random variables," Presented at 5th International Conference on Learning Representations, Toulon, France, Apr. 24-26, 2017, 19 pages.

Ng, "Sparse autoencoder," CS294A Lecture Notes, 2011, 19 pages.

Oyallon et al., "Deep Roto-Translation Scattering for Object Classification," Proceedings of the IEEE Conference on Computer Vision and Pattern Recognition, Jun. 2015, pp. 2865-2873.

Radford et al., "Unsupervised Representation Learning with Deep Convolutional Generative Adversarial Networks," arXiv, Nov. 19, 2015, 15 pages.

Rasmus et al., "Semi-supervised Learning with Ladder Networks," Advances in Neural Information Processing Systems, Dec. 2015, 9 pages.

Rawlinson et al., "Sparse Unsupervised Capsules Generalize Better," arXiv, Apr. 17, 2018, 9 pages.

Sabour et al., "Dynamic routing between capsules," arXiv, Oct. 26, 2017, 11 pages.

Saqur et al., "CapsGAN: Using Dynamic Routing for Generative Adversarial Networks," arXiv, Jun. 7, 2018, 13 pages.

Tieleman, "Optimizing neural networks that generate images," Thesis for the degree of Doctor of Philosophy, University of Toronto, Graduate Department of Computer Science, 2014, 120 pages.

Upadhyay et al., "Generative Adversarial Network Architectures for Image Synthesis Using Capsule Networks," arXiv, Nov. 20, 2018, 9 pages.

Wang et al., "An Optimization View on Dynamic Routing Between Capsules," Presented at Sixth International Conference on Learning Representations, Vancouver, Canada, Apr. 30-May 3, 2018, 4 pages.

Zhang et al., "Fast dynamic routing based on weighted kernel density estimation," Presented at the 3rd International Symposium on Artificial Intelligence and Robotics, Nanjing, China, Nov. 24-25, 2018, pp. 301-309.

Zhao et al., "3D point capsule networks," arXiv, Dec. 27, 2018, 13 pages.

* cited by examiner

Reconstructed Images 230

Image Templates for Possible Object Parts 220

Input Images 210

OBJECT DISCOVERY IN IMAGES THROUGH CATEGORIZING OBJECT PARTS

CROSS-REFERENCE TO RELATED APPLICATION

This application is a national phase entry under 35 U.S.C. 371 of PCT Application No. PCT/US2020/034386, filed May 22, 2020, which claims priority to U.S. Provisional Application No. 62/852,293, filed May 23, 2019, and to U.S. Provisional Patent Application No. 62/864,390, filed Jun. 20, 2019. The entirety of each of the foregoing is incorporated by reference.

BACKGROUND

This specification relates to processing images using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that processes an image to detect objects in the image. Once the system has detected the objects, the output of the system can be provided for presentation to a user, can be used to classify the detected objects, e.g., into object classes, or can be used for some other downstream task, e.g., semantic segmentation, action classification, robotic control, and so on.

The system includes an object part neural network that processes an input image to generate predicted part feature data that can include, for each of multiple possible object parts, i) a part presence probability representing a likelihood that the possible object part is depicted in the input image, ii) a predicted pose of the possible object part in the input image given that the possible object part is depicted in the input image, and iii) an object part feature vector characterizing the depiction of the possible object part given that the possible object part is depicted in the input image. The system also includes an object detection neural network 130 that processes the predicted part feature data for the multiple possible object parts to generate an object detection output that identifies one or more objects depicted in the input image. Generally, the object detection neural network organizes the possible object parts into objects and their poses based on the predicted part feature data and then identifies which object parts belong to which objects.

In some implementations, one or both of the object part neural network or the object detection neural network can be trained as components of respective autoencoders. In these implementations, the object part neural network can also be called a "part capsule autoencoder" and the object detection neural network can also be called an "object capsule autoencoder."

The subject matter described in this specification can be implemented in particular embodiments so as to realize one or more of the following advantages.

The described techniques allow for objects to be detected in images even when no labeled data is available during training. In other words, the architecture of the described neural networks allow the neural networks to effectively perform object detection even when trained entirely on unlabeled data, i.e., when trained only on raw images. Once generated, the object detection outputs of the system can be used to accurately identify the object classes to which the detected objects belong even when only a few object class labels become available after training. Moreover, the described systems can acquire viewpoint invariant knowledge in a statistically efficient manner and do not rely on any sophisticated data augmentation techniques to generate quality object detection outputs, making the systems computationally efficient at inference and during training.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system that processes an image to detect objects in the image.

Figure 1:
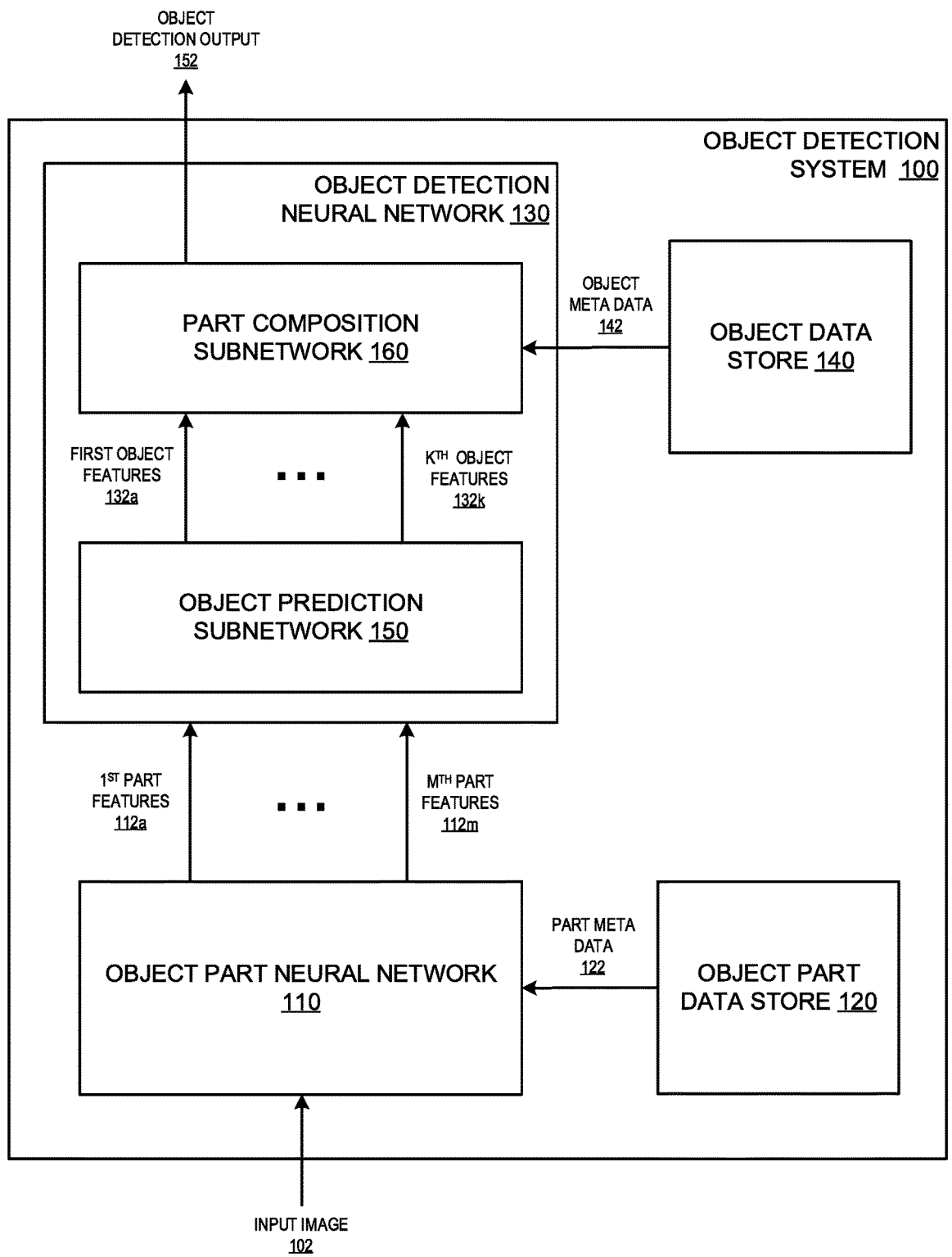
FIG. 1 is a diagram of an example object detection system.

FIG. 1 is a diagram of an example object detection system 100. The object detection system 100 is an example of a system implemented as computer programs on one or more computers in one or more locations, in which the systems, components, and techniques described below can be implemented.

The object detection system 100 is configured through training to receive an input image 102 and process the input image 102 to generate an object detection output 152 that identifies one or more objects depicted in the input image 102.

In some implementations, the detected objects in the object detection output 152 can include one or more objects that do not have a semantic meaning. That is, the object detection output 152 can include identifications of one or more detected objects that have no human-interpretable meaning, i.e., would not necessarily be identified as "objects" by a human. In some such implementations, the possible objects that can be identified in the object detection output 152 can be machine-learned, e.g., learned jointly with the parameters of the object detection system 100. This process is described in more detail below, e.g., in reference to FIG. 3.

The object detection system 100 includes an object part neural network 110 that receives the input image 102 and processes the input image to generate M sets of predicted part feature data 112*a-m* that each correspond to a respective possible object part that may be depicted in the input image 102.

In this specification, object parts are components of larger objects that can be depicted in input images. For example, possible objects depicted in an input image can include handwritten digits, and object parts of these objects can be individual strokes that combine to form the handwritten digits. As a particular example, an object might represent a handwritten "4," and the object might include three object parts that each respectively represent one of the three strokes of the handwritten "4." As another example, an object depicted in an image can represent a vehicle, and object parts of this object can include one or more wheels of the vehicle, one or more components of a body of the vehicle, etc.

That is, the object part neural network 110 processes the input image 102 and generates a respective predicted part feature set 112*a-m* for each of multiple possible object parts that may be depicted in the input image 102, where each predicted part feature set 112*a-m* characterizes the depiction of the corresponding possible object part in the input image 102. In some implementations, the object part neural network 110 generates a respective predicted part feature set 112*a-m* for each possible object part in a set of possible object parts.

In some implementations, the object part neural network 110 can also obtain part meta data 122 from an object part data store 120. The object part data store 120 can include meta data corresponding to each of multiple possible object parts depicted in the input image 102. The part meta data 122 corresponding to a particular possible object part characterizes how the particular possible object part can be depicted in an image. For example, the part meta data 122 corresponding to a particular possible object part can include a template that characterizes the particular possible object part such that if the template is processed using an affine transformation corresponding to a particular input image, the transformed template characterizes the position and appearance of the particular object part in the particular input image.

As a particular example, the part meta data 122 can include, for each possible object part, an image template corresponding to the possible object part that is a low-resolution image representation of the possible object part. As a particular example, the image template of a possible object part can be an image that has multiple color channels (e.g., three color channels corresponding to red, green, and blue channels) and an alpha channel. The alpha channel of an image template can represent a degree of transparency of each pixel, and can allow a portion of the pixels of the corresponding possible object part to be occluded in the input image 102. Image templates of possible object parts are described in more detail below in reference to FIG. 2.

In some implementations, the image templates of the possible object parts can be fixed, i.e., determined by a user of the object detection system 100. In some other implementations, the image templates can be machine learned, e.g., learned jointly with the parameters of the object detection system 100. This process is described in more detail below in reference to FIG. 3.

The object part neural network 110 generates a system input that includes i) the input image and, in some implementations, ii) the part meta data 122 corresponding to each possible object part. The object part neural network 110 processes the system input to generate the M predicted part feature sets 112*a-m*. Each predicted part feature set 112*a-m* corresponds to a respective possible object part depicted in the input image 102, and can include one or more of: i) a part presence probability representing a likelihood that the possible object part is depicted in the input image 102; ii) a predicted pose of the possible object part in the input image 102, given that the possible object part is depicted in the input image; or iii) an object part feature embedding characterizing the depiction of the possible object part, given that the possible object part is depicted in the input image 102.

In this specification, an embedding is an ordered collection of numeric values that represents an input in a particular embedding space. For example, an embedding can be a vector of floating point or other numeric values that has a fixed dimensionality.

The predicted pose of a possible object part and the object part feature embedding corresponding to the possible object part both describe the possible object part under the assumption that the possible object part is depicted in the input image 102. That is, the object part neural network 110 has not determined that the possible object part is depicted in the input image 102; rather, the object part neural network has generated the predicted pose and feature embedding of the possible object part, given that the possible object part is depicted in the input image 102. This assumption is true with a probability given by the part presence probability.

The predicted pose of a possible object part represents an affine transformation between the possible object part and the camera that captured the input image 102, given that the possible object part is depicted in the image. As a particular example, the predicted pose of a possible object part can be represented by a six-dimensional encoding, where two dimensions correspond to rotations, two dimensions correspond to translations, one dimension corresponds to scale, and one dimension corresponds to shear of the image template of the possible object part. That is, processing the image template of the possible object part using the affine transformation causes the transformed image template to be positioned within the input image 102 such that the transformed image template overlaps the portion of the input image 102 that depicts the possible object part, given that the possible object part is depicted in the input image 102.

The object part feature embedding of a possible object part characterizes the depiction of the possible object part in the input image 102, given that the possible object part is depicted in the input image 102. For example, the object part feature embedding can characterize one or more ways in which the depiction of the possible object part in the input image 102 is different from the image template of the possible object part (other than the pose of the possible object part within the input image 102). For example, the object part feature embedding can characterize the color of the possible object part as it is depicted in the input image 102. As another example, the object part feature embedding can characterize one or more occlusions of the possible object part as it is depicted in the input image 102.

In some implementations, the object part neural network 110 generates exactly one predicted part feature set 112 for each possible object part depicted in the input image 102; that is, the object part neural network 110 can only identify a single instance of each possible object part depicted in the input image 102. In some other implementations, the object part neural network 110 can generate multiple predicted part feature embeddings 112 for a single possible object part. For example, the object part data store 120 can contain k identical copies of the meta data corresponding to each possible object part, where k>1, so that the object part neural network 110 can generate k different predicted part feature sets 112 for each possible object part, allowing for up to k depictions of each possible object part in the input image 102.

In some implementations, the object part neural network 110 includes a convolutional subnetwork. Instead or in addition, the object part neural network 110 can include a respective possible part subnetwork corresponding to each possible object part. The process by which an object part neural network generates the M predicted part feature sets 112a-m is described in more detail below in reference to FIG. 4.

The object detection system 100 includes an object detection neural network 130 that receives the M predicted part feature sets 112a-m and generates the object detection output 152.

The object detection neural network 130 can include an object prediction subnetwork 150 and a part composition subnetwork 160. The object prediction subnetwork 150 is configured to receive the M predicted part feature sets 112a-m and generate K predicted object feature sets 132a-k, where each predicted object feature set 132a-k corresponds to a possible object that is depicted in the input image 102. That is, the object prediction subnetwork 150 can generate a respective predicted object feature set 132 for each of multiple possible objects that characterizes the depiction of the possible object in the input image 102, given that the possible object is depicted in the input image 102. In some implementations, the object prediction subnetwork 150 generates a respective predicted object feature set 132 for each possible object in a set of possible objects.

Each predicted object feature set 132a-k can include one or more of: i) an object presence probability representing a likelihood that the corresponding possible object is depicted in the input image 102, ii) an object feature embedding characterizing the depiction of the possible object, given that the possible object is depicted in the input image 102; or iii) a predicted pose of the possible object in the input image 102, given that the possible object is depicted in the input image.

Similar to the predicted part feature sets 112a-m, the object feature embedding of a possible object and the predicted pose of the possible object both describe the possible object under the assumption that the possible object is depicted in the input image 102. That is, the object prediction subnetwork 150 has not determined that the possible object is depicted in the input image 102; rather, the object prediction subnetwork 150 has generated the feature embedding and predicted pose of the possible object, given that the possible object is depicted in the input image 102. This assumption is true with a probability given by the object presence probability.

The predicted pose of the possible object represents an affine transformation between the possible object and the camera that captured the input image 102, given that the possible object is in the input image 102. As a particular example, the predicted pose of a possible object can be represented by a capsule-camera-relationship (CCR) matrix. For example, the CCR matrix can be a 3×3 matrix that represents the affine transformation between the possible object and the camera.

The object feature embedding of a possible object characterizes the depiction of the possible object in the input image 102, given that the possible object is depicted in the input image 102. In some implementations, the object feature embedding is a machine learned embedding, e.g., learned jointly with the parameters of the object detection system 100. This process is described in more detail below in reference to FIG. 3.

In some implementations, the object prediction subnetwork 150 processes the predicted part feature sets 112a-m using a permutation-invariant encoder neural network to generate the predicted object feature sets 132a-k. The process by which an object prediction subnetwork generates the K predicted object feature sets 132a-k is described in more detail below in reference to FIG. 5.

The object prediction subnetwork 150 can provide the K predicted object feature sets 132a-k to the part composition subnetwork 160.

In some implementations, the part composition subnetwork 160 can also obtain object meta data 142 from an object data store 140. The object data store 140 can include data corresponding to each of the multiple possible objects depicted in the input image 102. The object meta data 142 corresponding to a particular possible object characterizes a relationship between the particular possible object and each possible object part, e.g., characterizing a position of the possible object part in the possible object. For example, the object meta data 142 corresponding to a particular possible object can include a respective affine transformation between the particular possible object and each possible object part. That is, processing a representation of the possible object part using the affine transformation transforms the data from a coordinate system of the possible object part to a coordinate system of the possible object, such that a representation of the possible object part is in the correct position in relation to the possible object.

In some implementations, the object meta data 142 of the possible objects can be fixed, i.e., determined by a user of the object detection system 100. In some other implementations, the object meta data 142 can be machine learned, e.g., learned jointly with the parameters of the object detection system 100. The object meta data 142 is described in more detail below in reference to FIG. 5.

The part composition subnetwork 160 can generate a network input from the predicted object feature sets 132a-k and, optionally, from the object meta data 142. The part composition subnetwork 160 can then process the network input to generate the object detection prediction 152 that identifies one or more objects that are depicted in the input image 102, from the K possible objects that might be depicted in the input image 102. This process is described in more detail below in reference to FIG. 5 and FIG. 6.

The object detection output 152 can include, for each of the one or more identified objects in the input image 102, a position of the identified object in the input image 102. In some implementations, the object detection output 152 can also include a probability that the identified object is depicted in the input image 102, and/or a probability distribution over possible poses of the identified object in the input image 102.

The object detection system 100 can provide the object detection output 152 to a user display system for display to a user. Instead or in addition, the object detection system 100 can provide the object detection output 152 to a downstream system for further processing, e.g., a semantic segmentation system.

In some implementations, the object part neural network 110 is trained through unsupervised learning as part of an image autoencoder that encodes input images. Similarly, in some implementations, the object detection neural network 130 is trained through unsupervised learning as part of an object part pose autoencoder that encodes poses of object parts from input images. This process is described in more detail below in reference to FIG. 3.

Figure 2:
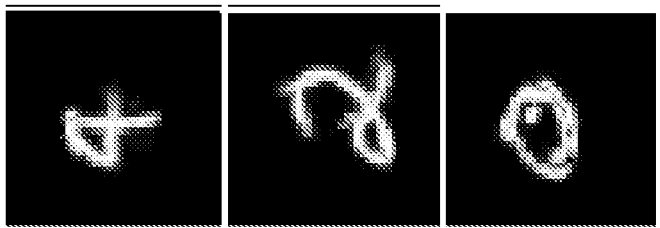
FIG. 2 is an illustration of example input images and example reconstructed images.
Figure 2:
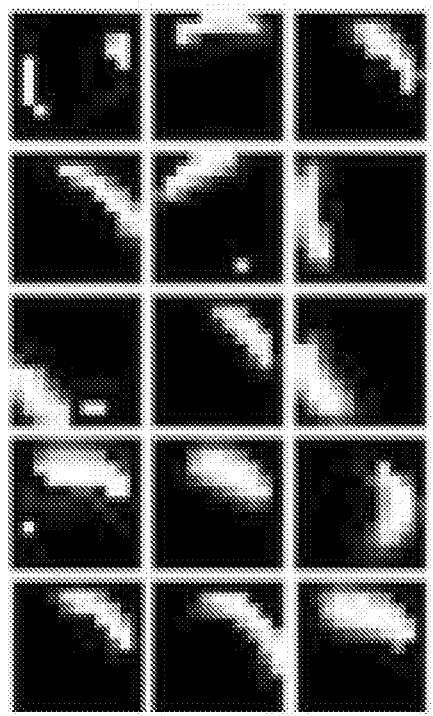
Figure 2:
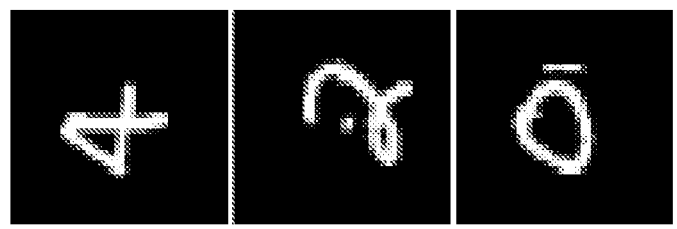

FIG. 2 is an illustration of example input images 210 and example reconstructed images 230. The reconstructed images 230 are generated using image templates 220 that characterize possible object parts depicted in the input images 210.

The reconstructed images 230 are generated according to an object detection system, e.g., the object detection system 100 depicted in FIG. 1. In particular, for each reconstructed image 230, the object detection system processed the corresponding input image 210 to identify one or more possible object depicted in the input image 210.

Each possible object depicted in an input image 210 is composed of one or more object parts. Each object part is characterized by a corresponding image template 220, which is a low-resolution image of the possible object part. In some implementations, the image templates 220 for the possible object parts are machine learned through training of the object detection system by processing training input images 210. An example training system is described in more detail below in reference to FIG. 3.

For each object part of each object identified within an input image 210, the object detection system 100 can generate a predicted pose of the object part. The predicted pose of an object part defines an affine transformation that, if used to process the image template 220 corresponding to the object part, causes the image template to be positioned over the portion of the input image 210 that corresponds to the object part.

Therefore, the reconstructed images 230 have been generated using i) the image templates 220 and ii) the predicted poses of the corresponding object parts. That is, for each input image 210 and for each object part depicted in the input image 210, a system processed the image template 220 corresponding to the object part using the generated predicted pose of the object part to generate a transformed image template. The system then combined the transformed image templates for each input image 210 to generate the corresponding reconstructed image 230.

Figure 3:
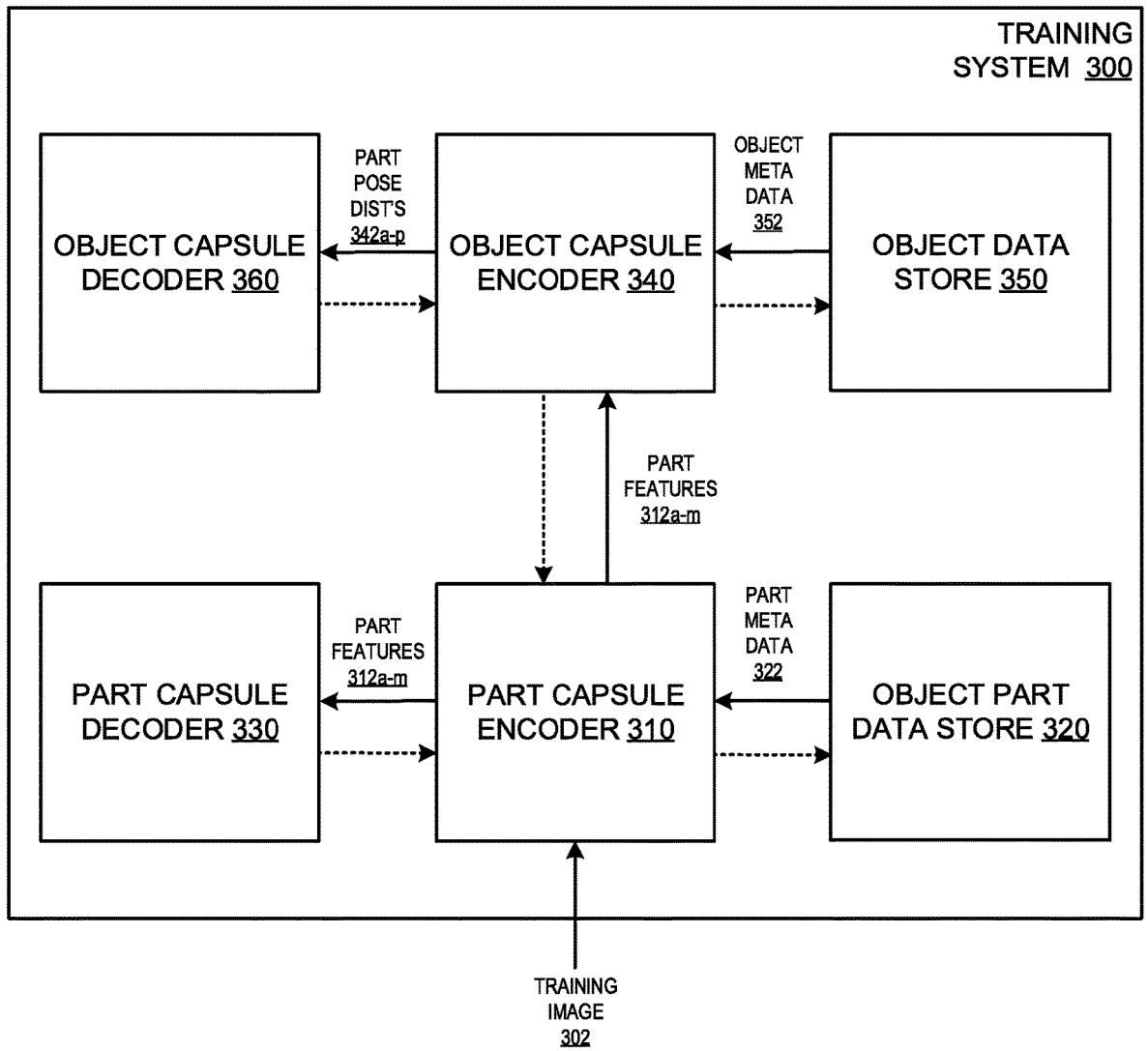
FIG. 3 is a diagram of an example training system.

FIG. 3 is a diagram of an example training system 300. The training system 300 is an example of a system implemented as computer programs on one or more computers in one or more locations, in which the systems, components, and techniques described below can be implemented.

The training system 300 is configured to process training images 302 in order to update the parameters of i) a part capsule autoencoder, which includes a part capsule encoder 310 and a part capsule decoder 330; and ii) an object capsule autoencoder, which includes an object capsule encoder 340 and an object capsule decoder 360. In particular, the training system 300 is configured to perform unsupervised training on the part capsule autoencoder and the object capsule autoencoder; that is, the training image 302 is not "labeled," i.e., does not have an associated ground-truth label that characterizes one or more objects depicted in the training image 302.

In some implementations, the part capsule encoder 310 includes an object part neural network, e.g., the object part neural network 110 depicted in FIG. 1. After the training system 300 has completed training the part capsule encoder 310, i.e., after the training system 300 has generated final parameters for the part capsule encoder 310 including generating final parameters for the object part neural network, the object part neural network can be used by an object detection system, e.g., the object detection system 100 depicted in FIG. 1, to detect objects in input images.

Similarly, in some implementations, the object capsule encoder 340 includes an object detection neural network, e.g., the object detection neural network 130 depicted in FIG. 1. After the training system 300 has completed training the object capsule encoder 340, i.e., after the training system 300 has generated final parameters for the object capsule encoder 340 including generating final parameters for the object detection neural network, the object detection neural network can be used by an object detection system, e.g., the object detection system 100 depicted in FIG. 1, to detect objects in input images.

The part capsule encoder 310 can receive the training image 302. In some implementations, the part capsule encoder 310 can also obtain part meta data 322 from an object part data store 320. The object part data store 320 includes meta data corresponding to each of multiple possible object parts depicted in the training image 302. The part meta data 322 can include, for each possible object part, an image template corresponding to the possible object part.

The part capsule encoder 310 can process a network input that includes i) the training image 302 and ii) the part meta data 322 to generate M predicted part feature sets 312a-m. In some implementation, multiple part feature sets are predicted, i.e. M>1. Each predicted part feature set 312a-m corresponds to a respective possible object part depicted in the training image 302, and can include one or more of: i) a part presence probability representing a likelihood that the possible object part is depicted in the training image 302; ii) a predicted pose of the possible object part in the training image 302, given that the possible object part is depicted in the training image 302; or iii) an object part feature embedding characterizing the depiction of the possible object part, given that the possible object part is depicted in the training image 302.

In other words, the part capsule encoder 310 can encode the training image 302, generating an encoding represented by the predicted part feature sets 312a-m. That is, the predicted part feature sets 312a-m characterize object parts that are represented by image templates. The training system 300 can manipulate the image templates according to the predicted part feature sets 312a-m, as described above with reference to FIG. 2, in order to generate a reconstructed image. This reconstructed image represents an encoding of the original training image 302, and therefore the predicted part feature sets 312a-m represent an encoding of the original training image 302.

The part capsule encoder 310 can provide the predicted part feature sets 312a-m to the part capsule decoder 330, which can determine a loss of the encoding represented by the predicted part feature sets 312a-m.

In some implementations, the part capsule decoder 330 can determine an "image likelihood" given the encoding of the training image 302 represented by the predicted part feature sets 312a-m. That is, the part capsule decoder 330 can compute a probability of the observed training image 302 conditioned on the encoding represented by the predicted part feature sets 312a-m.

As a particular example, the part capsule decoder 330 can compute:

$$p(y) = \prod_{i,j} \sum_{m=1}^{M} p^y_{m,i,j} \mathcal{N}(y_{i,j} | c_m \cdot \hat{T}^c_{m,i,j}; \sigma^2_y)$$

where y is the training image 302; M is the number of possible object parts; (i,j) represents a particular pixel position within the training image 302; $p_{m,i,j}^y$ represents mixing probabilities of different possible object parts m at the same pixel position (i,j); $c_m$ represents the predicted color of the image template of the $m^{th}$ possible object part; $\hat{T}_m$ represents the transformed image template of the $m^{th}$ possible object part after processing the original template $T_m$ of the $m^{th}$ possible object part according to the predicted pose of the $m^{th}$ possible object part identified in the predicted part feature set 312; $\hat{T}_{m,i,j}^c$ represents the color channels of the transformed image template of the $m^{th}$ possible object part at the $(i,j)^{th}$ pixel position; and $\sigma_y^2$ is a constant variance value.

The predicted color $c_m$ can be generated by processing the object part feature embedding of the $m^{th}$ object part identified in the predicted part feature set 312 using a neural network, e.g., a multi-layer perceptron.

In some implementations, the mixing probability $p_{m,i,j}^y$ of a possible object part at a particular pixel position (i,j) is proportional to i) the presence probability of the possible object part identified in the predicted part feature set 312 and ii) an alpha value of the transformed image template of the possible object part at the particular pixel position, i.e.:

$$P_{m,i,j}^y \propto d_m \hat{T}_{m,i,j}^a$$

The part capsule decoder 330 can determine an update to the parameters of the part capsule encoder 310 using the computed image likelihood. The training system 300 can backpropagate the update through the part capsule encoder 310. The dotted lines depicted in FIG. 3 denote a direction of backpropagation.

The training system 300 can further backpropagate the parameter update to the object part data store 320, updating the image templates of the possible object parts. That is, because the image templates are inputs to the part capsule encoder 310 when the part capsule encoder 310 generates the predicted part feature sets 312a-m, the training system can backpropagate the gradients to the image templates and determine updates to the values of each channel of the image templates. In this way, the training system 300 can automatically learn the image templates of the possible objects parts, which define the possible object parts themselves. Thus, a user of the training system 300 does not have to determine what the possible object parts should be; rather, the training system 300 can determine, through training, optimal characteristics of possible object parts that can be used to characterize a wide range of training images 302.

The part capsule encoder 310 can provide the predicted part feature sets 312a-m to the object capsule encoder 340. In some implementations, the object capsule encoder 340 can also obtain object meta data 352 from an object data store 350. The object meta data 352 includes data corresponding to each of multiple possible objects depicted in the training image 302. The object meta data 352 corresponding to a particular possible object includes a respective affine transformation between the particular possible object and each possible object part. For example, the object meta data 352 can include, for each possible object, a respective capsule-part-relationship (CPR) matrix for each of the M possible object parts, where each CPR matrix represents an affine transformation between the possible object and the possible object part.

The object capsule encoder 340 can process a network input that includes i) the predicted part feature sets 312a-m and ii) the object meta data 352 to generate predicted P part pose distributions 342a-p that include a respective part pose distribution corresponding to each possible object and each possible object part, where P=M·K and M is the number of possible object parts and K is the number of possible objects. The part pose distribution 342 for a particular possible object and particular possible object part identifies a range of particular poses within the training image 302 of the particular possible object part, with associated probabilities for each particular pose, given that the particular possible object part is a component of the particular possible object. Part pose distributions are discussed in more detail below in reference to FIG. 6.

In other words, the object capsule encoder 340 can encode the predicted part feature sets 312a-m into an encoding represented by the part pose distributions 342a-p. That is, the object capsule encoder 340 takes the predicted part feature sets 312a-m as ground truth, i.e., assumes that the predicted pose of each possible object identified in the predicted part feature sets 312-am is correct. The object capsule encoder can then generate part pose distributions 342a-p that represent the same possible object parts, assigned to different particular possible objects. The part pose distributions 342a-p therefore represents an encoding of the predicted poses identified in the predicted part feature sets 312a-m.

The object capsule encoder 340 can provide the part pose distributions 342a-p to the object capsule decoder 360, which can determine a loss of the encoding represented by the part pose distributions 342a-p.

In some implementations, the object capsule decoder 360 can determine a "part pose likelihood" given the encoding of the poses of the possible object parts identified in the predicted part feature sets 312a-m. That is, the object capsule decoder 360 can compute a probability of the observed poses in the predicted part feature sets 312a-m conditioned on the encoding represented by the part pose distributions 342a-p.

For example, the object capsule decoder 360 can compute:

$$p(x_{1:M}, d_{1:M}) = \prod_{m=1}^{M} \left[ \sum_{k=1}^{K} \frac{a_k a_{k,m}}{\Sigma_i a_i \Sigma_j a_{i,j}} p(x_m | k, m) \right]^{d_m}$$

where $a_k$ is a presence probability that the $k^{th}$ possible object is depicted in the training image 302; $a_{k,m}$ is the conditional probability that the $m^{th}$ possible object part is depicted in the training image 302 given that the $m^{th}$ possible object part is in the $k^{th}$ possible object; $x_m$ is the predicted pose of the $m^{th}$ possible object part identified in the predicted part feature sets 312a-m; $p(x_m|k, m)$ represents the probability of the predicted pose of the $m^{th}$ possible object part given that the $m^{th}$ possible object part is in the $k^{th}$ possible object; and $d_m$ is the presence probability that the $m^{th}$ possible object part is in the training image identified in the predicted part feature sets 312a-m.

In some implementations, the probability $p(x_m|k,m)$ is given by a normal distribution that has a mean and variance computed according to the predicted part feature sets 312a-m. That is, $$p(x_m|k, n) = \mathcal{N}(x_m | \mu_{k, n}, \lambda_{k, n})$$

This process is discussed in more detail below in reference to FIG. 6.

The object capsule decoder 360 can determine an update to the parameters of the object capsule encoder 340 using the computed part pose likelihood. The training system 300 can backpropagate the update through the object capsule encoder 340.

The training system 300 can further backpropagate the parameter update to the object data store 350, updating the object meta data 352, e.g., updating the CPR matrices corresponding to each possible object and each possible object part. That is, because the CPR matrices are inputs to the object capsule encoder 340 when the object capsule encoder 340 generates the part pose distributions 342*a-p*, the training system can backpropagate the gradients to the CPR matrices and determine updates to the values of each element in each matrix. In this way, the training system 300 can automatically learn the relationship between possible object parts and possible objects. Thus, a user of the training system 300 does not have to determine what the possible objects should be or how the possible object parts should be combined to form the possible objects; rather, the training system 300 can determine, through training, optimal possible objects that can be used to characterize a wide range of training images 302, and optimal combinations of possible objects parts that can be used to form the possible objects.

In some implementations, the part capsule autoencoder and the object capsule autoencoder are trained jointly. For example, during training, the training system 300 can backpropagate gradients from the object capsule encoder 340 to the part capsule encoder 310. In some implementations, a stop gradient can be applied to each input to the object capsule encoder except the object part feature embeddings identified in the predicted part feature sets 312*a-m*. That is, the training system 300 does not backpropagate to the part capsule encoder 310 the gradients of any input to the object capsule encoder 340 except the object part feature embeddings.

In some implementations, the training objective of the training system 300 can encourage sparsity and diversity in the possible objects and possible object parts, as defined by the CPR matrices in the object data store 350 and the image templates in the object part data store 320, respectively. That is, the training objective used to train the object capsule autoencoder and the part capsule autoencoder can encourage the training system 300 to learn parameters that i) allow particular possible objects to be specialized to particular arrangements of possible object parts, and ii) allow a wider variety of possible objects and possible object parts to be identified in different training images.

The training system 300 might be training the object part neural network and the object detection neural network to be part of an image classification system, where each input image is assigned one or more particular classes from a set of classes. That is, the object detection output generated by the object detection neural network, e.g., the object detection output 152 depicted in FIG. 1, can be provided to a downstream system that classifies the input image according to the object detection output. In this case, there might be C possible classes, K possible objects, and M possible object parts.

Generally, a particular subset of the possible objects corresponds to a particular class; that is, if the particular subset of the possible objects is identified in an input image, the input image can be assigned to the particular class. In some implementations, there is a one-to-one relationship between the possible classes and the possible objects; that is, C=M and each possible object corresponds to a particular class. In some other implementations, one or more classes might correspond to a particular subset of multiple possible objects, i.e., $M<C \leq 2^M$. In this specification, a class "includes" one or more particular objects if the class corresponds to the one or more particular object.

For example, the training system 300 can generate parameter updates using a training objective that encourages one or more of the following features: i) each class includes the same number of possible objects, or ii) each possible object is included in the same number of classes.

As a particular example, the training system 300 can process a batch of training images 302 of size B and generate a parameter update in order to maximize the image likelihoods and part pose likelihoods of the batch, $\mathcal{L} = \log p(y) + \log p(x_{1:M})$. To do so, for each training image 302 in the batch, the system can compute a prior object presence probability for each possible object:

$$a_k^{prior} = a_k \max_m a_{m,k}.$$

The training system 300 can compute the sum, for each possible object, of prior object presence probabilities across the batch of training images:

$$\bar{u}_k = \Sigma_{b=1}^B a_{b,k}^{prior}$$

and the sum, for each training image in the batch of training images, of prior object presence probabilities across the possible objects:

$$\hat{u}_b = \Sigma_{k=1}^K a_{b,k}^{prior}$$

In this particular example, the training system 300 can assume that exactly one class is depicted in each image. In order to encourage each class to include the same number of possible objects, the training system 300 can encourage $K/C \approx \hat{u}_b$. In order to encourage each possible object to be included in the same number of classes, the training system 300 can encourage $B/C \approx \bar{u}_k$. Therefore, the training system 300 can generate a parameter update in order to minimize:

$$\mathcal{L}_{prior} = \frac{1}{B}\sum_{b=1}^B (\hat{u}_b - K/C)^2 + \frac{1}{K}\sum_{k=1}^K (\bar{u}_k - B/C)^2.$$

As another example, the training system 300 can minimize the entropy within training images in a batch of training images 302 of size B. Instead or in addition, the training system 300 can maximize the entropy between the training images in the batch.

As a particular example, the training system 300 can process a batch of training images 302 of size B and generate a parameter update in order to maximize the image likelihoods and part pose likelihoods of the batch, $\mathcal{L} = \log p(y) + \log p(x_{1:M})$. To do so, for each training image 302 in the batch, the system can compute a posterior object part presence probability for each possible object and each possible object part:

$$a_{k,m}^{posterior} = a_k a_{k,m} \mathcal{N}(x_m|m,k)$$

The training system 300 then generate a parameter update in order to minimize:

$$\mathcal{L}_{posterior} = \frac{1}{K}\sum_{k=1}^K \mathcal{H}(\bar{v}_k) - \frac{1}{B}\sum_{b=1}^B \mathcal{H}(\hat{v}_b).$$

H is a measure of entropy. For example, $H(v_i)=-\Sigma_i v_i \log_2(v_i)$.

$\overline{v}_k$ is the sum, for possible object k, of posterior object part presence probabilities across the training images, $\Sigma_{b,m} a_{b,k,m}^{posterior}$, or a normalized version thereof.

$\overline{v}_b$ is a sum, for training image b, of posterior object part presence probabilities across the possible objects, $\Sigma_{k,m} a_{b,k,m}^{posterior}$, or a normalized version thereof.

Figure 4:
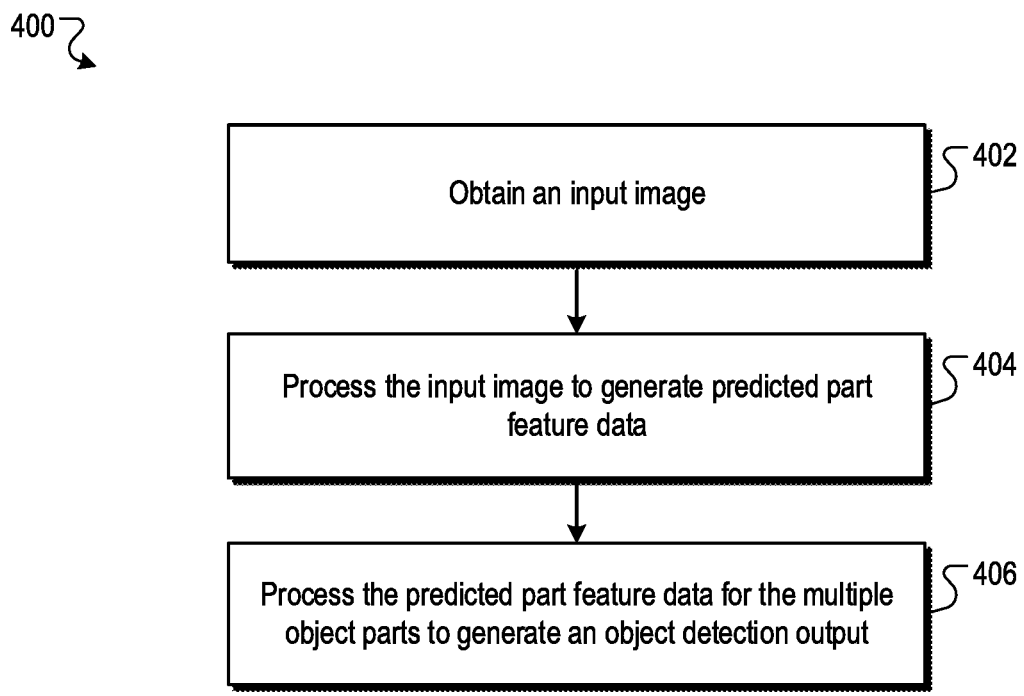
FIG. 4 is a flow diagram of an example process for generating an object detection output.

FIG. 4 is a flow diagram of an example process 400 for generating an object detection output. For convenience, the process 400 will be described as being performed by a system of one or more computers located in one or more locations. For example, an object detection system, e.g., the object detection system 100 depicted in FIG. 1, appropriately programmed in accordance with this specification, can perform the process 400.

The system obtains an input image (step 402). The input image can include one or more depictions of particular possible objects, each of which are composed of one or more possible object parts.

The system processes the input image to generate predicted part feature data (step 404). For example, the system can process the input image using an object part neural network, e.g., the object part neural network 110 depicted in FIG. 1.

The predicted part feature data can include, for each of multiple possible object parts: i) a part presence probability representing a likelihood that the possible object part is depicted in the input image; ii) a predicted pose of the possible object part in the input image given that the possible object part is depicted in the input image; and iii) an object part feature embedding characterizing the depiction of the possible object part given that the possible object part is depicted in the input image.

In some implementations, the system can process the input image using an object part neural network that includes a convolutional subnetwork that includes one or more convolutional neural network layers. The convolutional subnetwork can process the input image to generate the predicted part feature sets. For example, the object part neural network can include one or more upsampling convolutional layers followed by one or more convolutional neural network layers that each have a channel depth of M, i.e., have M filters per convolutional neural network layer, where M is the number of possible object parts. The output of these layers can then be reshaped or processed using additional neural network layers to generate the M predicted part feature sets.

As another example, the object part neural network can include a respective subnetwork corresponding to each possible object part depicted in the input image, such that each subnetwork processes the output of the convolutional subnetwork to generate the corresponding predicted part feature set. For example, each subnetwork can be a multi-layer perceptron that generates the corresponding object part feature embedding, which is a unique embedding for the possible object part as depicted in the input image.

The system processes the predicted part feature data for the multiple possible object parts to generate an object detection output that identifies one or more objects depicted in the input image (step 406). For example, the system can process the predicted part feature data using an object detection neural network, e.g., the object detection neural network 130 depicted in FIG. 1. This process is described in more detail below in reference to FIG. 5.

The object detection output includes data identifying one or more possible objects that are depicted in the input image from the set M possible objects. The object detection output can also identify, for each identified possible object, a position in the input image of the identified possible object. In some implementations, the object detection output includes, for each identified possible object, a presence probability characterizing a likelihood that the identified possible object is depicted in the input image. In some implementations, the object detection output further includes, for each identified possible object, a probability distribution over possible positions in the input image of the identified possible object.

Figure 5:
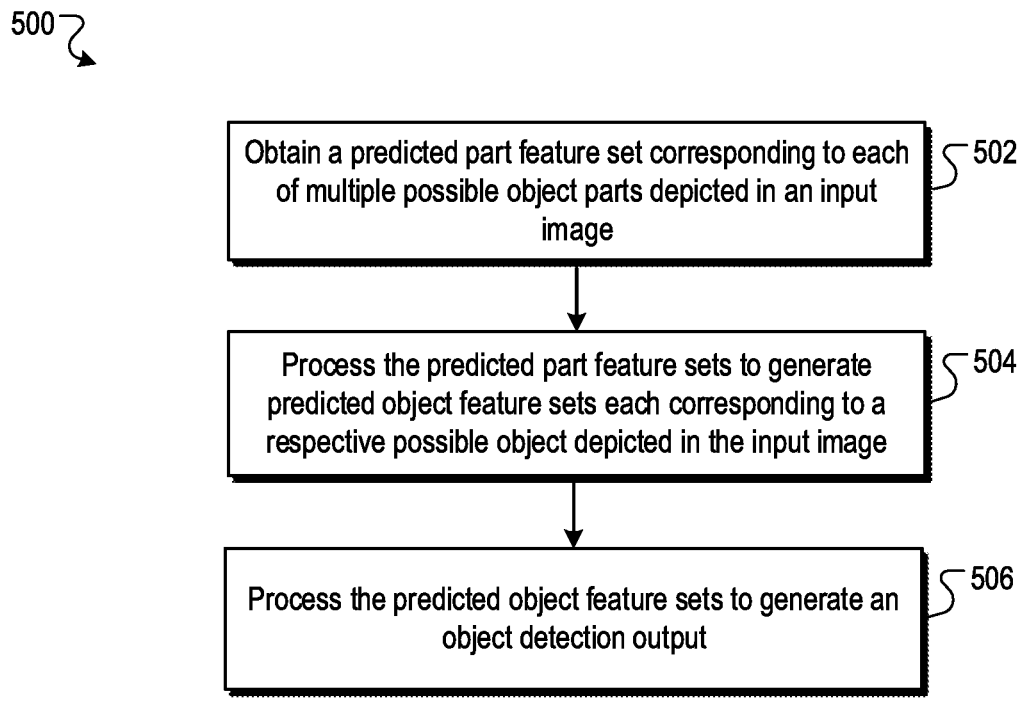
FIG. 5 is a flow diagram of an example process for processing predicted part feature data to generate an object detection output.

FIG. 5 is a flow diagram of an example process 500 for processing predicted part feature data to generate an object detection output. For convenience, the process 500 will be described as being performed by a system of one or more computers located in one or more locations. For example, an object detection neural network, e.g., the object detection neural network 130 depicted in FIG. 1, appropriately programmed in accordance with this specification, can perform the process 500.

The system obtains a predicted part feature set corresponding to each of multiple possible object parts that may be depicted in an input image (step 502). The predicted part feature data can include, for each of multiple possible object parts: i) a part presence probability representing a likelihood that the possible object part is depicted in the input image; ii) a predicted pose of the possible object part in the input image given that the possible object part is depicted in the input image; and/or iii) an object part feature embedding characterizing the depiction of the possible object part given that the possible object part is depicted in the input image. In some implementations, the predicted part feature sets each include an image template characterizing the corresponding possible object part.

The system processes the predicted part feature sets to generate predicted object feature sets, where each predicted object feature set corresponds to a respective possible object that may be depicted in the input image (step 504). For example, the system can process the predicted part feature sets using an object prediction subnetwork, e.g., the object prediction subnetwork 150 depicted in FIG. 1.

Each predicted object feature set can include: i) an object presence probability representing a likelihood that the corresponding possible object is depicted in the input image, ii) an object feature embedding characterizing the depiction of the possible object given that the possible object is depicted in the input image; and/or iii) a predicted pose of the possible object in the input image, given that the possible object is depicted in the input image. For example, the predicted pose of the possible object in the input image can be represented by a capsule-camera-relationship (CCR) matrix.

In some implementations, the object prediction subnetwork processes the predicted part feature sets using a permutation-invariant encoder neural network to generate the predicted object feature sets. For example, the permutation-invariant encoder neural network can have a Set Transformer architecture. Set Transformers are described in more detail in "Set Transformer: A Framework for Attention-based Permutation-Invariant Neural Networks," Lee et al., arXiv:1810.00825.

In some implementations, the system can generate a network input for the object prediction subnetwork by combining i) the predicted poses of the possible object parts identified in the predicted part feature sets, ii) the object part feature embeddings of the possible object parts identified the predicted part feature sets, and iii) the image templates of the possible object parts identified in the predicted part feature sets. For example, the system can concatenate the predicted poses, object part feature embeddings, and flattened versions of the image templates to generate the network input. That is, the system can process each image template to generate a version of the image template that has the same dimensions as the predicted poses and object part feature embeddings, e.g., a one-dimensional version. The object prediction subnetwork can then process the network input using the permutation-invariant encoder neural network. In some implementations, the permutation-invariant encoder neural network can use the part presence probabilities of the possible object parts identified in the predicted part feature sets as bias values in one or more attention mechanisms in the permutation-invariant encoder neural network.

The system processes the predicted object feature set of each possible object to generate an object detection output (step 506). The object detection output includes data identifying one or more possible objects that are depicted in the input image from a set M possible objects. The object detection output can also identify, for each identified possible object, a position in the input image of the identified possible object.

In some implementations, the system identifies one or more possible objects in the input image according to the object presence probability of each possible object identified in the respective object feature sets. For example, the system might determine that a particular possible object is depicted in the input image if the corresponding object presence probability is above a certain threshold. In some such implementations, the system can further include the predicted pose of each identified possible object in the object detection output, e.g., using the CCR matrix of the identified possible object.

In some other implementations, the system can process the predicted object feature sets to generate, for each possible object and possible object part, a part pose distribution that characterizes a probability distribution over possible poses for the possible object part given that the possible object part is in the possible object. Then, the system can process the part pose distributions to generate the object detection output. This process is described in more detail below in reference to FIG. 6.

Figure 6:
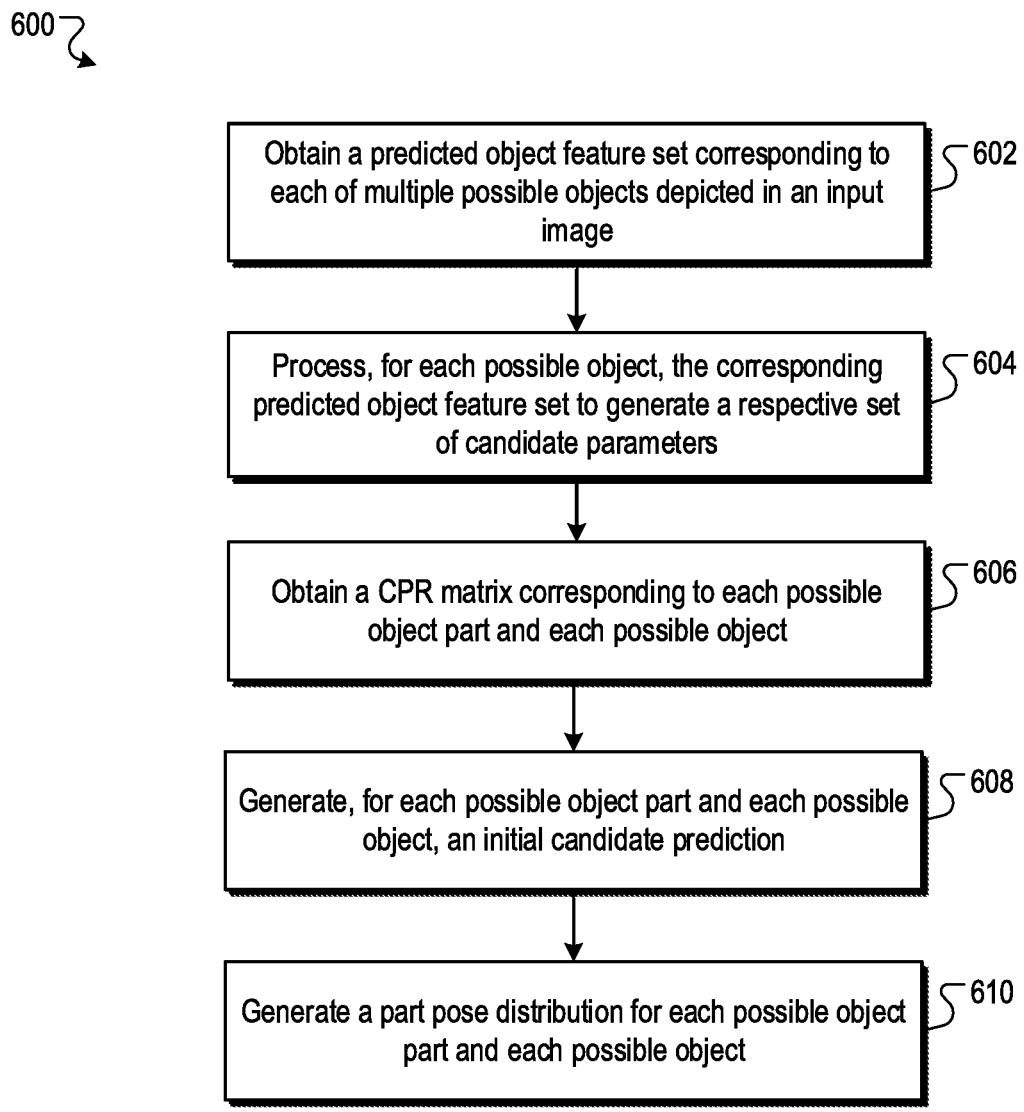
FIG. 6 is a flow diagram of an example process for generating part pose distributions.

FIG. 6 is a flow diagram of an example process 600 for generating part pose distributions. For convenience, the process 600 will be described as being performed by a system of one or more computers located in one or more locations. For example, an object detection neural network, e.g., the object detection neural network 130 depicted in FIG. 1, appropriately programmed in accordance with this specification, can perform the process 600.

Each part pose distribution characterizes a probability distribution over possible poses of a particular possible object part within an input image, given that the particular possible object part is in a particular possible object. The system can generate probability distributions for each of multiple possible objects and each of multiple possible object part.

The system obtains a predicted object feature set corresponding to each of the possible objects (step 602). Each predicted object feature set can include: i) an object presence probability representing a likelihood that the corresponding possible object is depicted in the input image, ii) an object feature embedding characterizing the depiction of the possible object given that the possible object is depicted in the input image; and/or iii) a predicted pose of the possible object in the input image, given that the possible object is depicted in the input image. For example, the predicted pose of the possible object in the input image can be represented by a capsule-camera-relationship (CCR) matrix.

The system processes, for each possible object, the corresponding predicted object feature set to generate a respective set of candidate parameters (step 604). For example, the system can process the object feature sets using a part composition subnetwork, e.g., the part composition subnetwork 160 depicted in FIG. 1.

The candidate parameters for a particular possible object can include i) a conditional probability, for each possible object part, that the possible object part is depicted in the input image, given that the possible object part is a part of the particular possible object; and/or ii) a predicted scalar precision for each possible object part characterizing the precision of the part pose distribution corresponding to the particular possible object and the possible object part. The predicted scalar precision can, for example, be a standard deviation corresponding to the corresponding part pose distribution.

As a particular example, the object prediction subsystem can generate the candidate parameters for a particular possible object by processing the object feature embedding identified in the corresponding predicted object feature set using a feedforward neural network, e.g., a multilayer perceptron, that is specific to the particular possible object. That is, the object prediction subsystem can include K different feedforward neural networks that each correspond to a respective possible object.

The system obtains, for each possible object, a respective capsule-part-relationship (CPR) matrix corresponding to each possible object part (step 606). Each CPR matrix represents an affine transformation between a possible object and a possible object part. That is, the CPR matrix represents the position of the possible object part in relation to the possible object, given that the possible object part is a member of the possible object. In some implementations, the system can generate the CPR matrices corresponding to a particular possible object using the feedforward neural network used to generate the conditional probabilities and predicted scalar precisions corresponding to the particular possible object. That is, the CPR matrices corresponding to a particular possible object can be a component of the generated candidate parameters of the particular possible object. In some other implementations the system can obtain the CPR matrix from a data store, e.g., the object data store 140 depicted in FIG. 1.

The system generates, for each possible object part and each possible object, an initial candidate prediction for the possible object part, given that the possible object part is a member of the possible object (step 608). Each initial candidate prediction represents a particular pose of the corresponding possible object part within the initial image, given that the possible object part is part of the corresponding possible object.

For example, the system can generate the initial candidate prediction for a particular possible object part and particular possible object by combining i) the CCR matrix corresponding to the particular possible object and ii) the CPR matrix corresponding to the particular possible object part and the particular possible object. For example, the system can multiply the CCR matrix corresponding to the particular possible object and the CPR matrix corresponding to the particular possible object and particular possible object part.

The system generates, for each possible object part and for each possible object, the part pose distribution characterizing the probability distribution over possible poses of the possible object part, given that it is a member of the possible object (step 610). For example, the system can generate the part pose distribution for a particular object and particular object part by combining the corresponding initial candidate prediction and the corresponding scalar precision. As a particular example, the system can generate a Normal distribution for each possible object part and possible object, where the mean of the Normal distribution is equal to the corresponding initial candidate prediction and the standard deviation of the Normal distribution is equal to the corresponding scalar precision.

After generating the part pose distribution for each possible object and possible object part, the system can use the part pose distribution to generate an object detection output.

In some implementations, for each possible object and each possible object part, the system can use the corresponding part pose distribution to determine an object-object-part probability that characterizes the likelihood that the possible object part is in the possible object. For example, the system can obtain a predicted pose of the possible object part in the input image, independent of the possible object; e.g., the system can obtain a predicted pose of the possible object part as identified in a predicted part feature set generated by an object part neural network, e.g., the object part neural network 110 depicted in FIG. 1. The system can then determine the object-object-part probability to be the probability of the predicted pose of the possible object part given by the part pose distribution, e.g., the determined Normal distribution, of the possible object part and possible object.

In some implementations, the system can assign, for each possible object part, the possible object part to a possible object. As a particular example, the system can assign each possible object part to the possible object that has the highest corresponding object-object-part probability. As another particular example, the system can assign a possible object part to the possible object that has the highest corresponding object-object-part probability if the corresponding object-object-part probability is above a certain threshold, and not assign the possible object part to any possible object otherwise.

The system can then identify, in the object detection output, each possible object to which one or more possible object parts have been assigned. In some implementations, the system only includes in the object detection output a subset of the possible objects that were assigned possible object parts. For example, the system might only identify a particular possible object in the object detection output if the particular object was assigned a possible object part whose corresponding objet-object-part probability is above a certain threshold. As another example, the system might only identify a particular possible object if the number of possible object parts assigned to the particular possible object is above a certain threshold.

In some implementations, the system identifies the possible object parts that have been assigned to each possible object identified in the object detection output. In some such implementations, for each possible object part assigned to a possible object identified in the object detection output, the system identifies the predicted pose of the possible object part identified in the predicted part feature set generated by an object part neural network; i.e., the system can identify the predicted pose of the possible object part that is independent of the possible object.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations.

Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, .e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
obtaining an input image;
processing the input image using an object part neural network to generate predicted part feature data, the predicted part feature data comprising, for each of a plurality of possible object parts:
  a part presence probability representing a likelihood that the possible object part is depicted in the input image,
  a predicted pose of the possible object part in the input image given that the possible object part is depicted in the input image, and
  an object part feature vector characterizing the depiction of the possible object part given that the possible object part is depicted in the input image; and
processing the predicted part feature data for the plurality of possible object parts using an object detection neural network to generate an object detection output that identifies one or more objects depicted in the input image.

Embodiment 2 is the method of embodiment 1, wherein the object part neural network comprises a convolutional neural network that is configured to process the input image to generate the presence probability, the predicted pose, and the object part feature vector for each of the possible object parts.

Embodiment 3 is the method of any one of embodiments 1 or 2, wherein the predicted part feature data further comprises a respective image template for each of the possible object parts that is a low-dimensional image of the possible object part.

Embodiment 4 is the method of any one of embodiments 1-3, wherein processing the predicted part feature data comprises:

processing the predicted part feature data using a permutation-invariant encoder neural network to generate predicted object feature data, the predicted object feature data comprising, for each of a plurality of possible objects:
- an object presence probability representing a likelihood that the possible object is depicted in the input image,
- an object feature vector characterizing the depiction of the possible object given that the possible object is depicted in the input image;
- a capsule-camera-relationship (CCR) matrix that represents an affine transformation between the possible object and a camera capturing the image;

for each possible object, generating, from the predicted object feature data and for each possible object part, a probability distribution over possible poses of the possible object part given that the possible object part is part of the possible object; and generating the object detection output using the probability distributions.

Embodiment 5 is the method of embodiment 4, wherein generating, from the predicted object feature data and for each possible object part, a probability distribution over possible poses of the possible object part comprises:

generating, for each possible object and from the object feature vector for the possible object, candidate parameters that comprise (i) a respective capsule-part-relationship (CPR) matrix for each of the possible object parts that represents an affine transformation between the possible object and the possible object part and (ii) a respective predicted scalar precision for each of the possible object parts;

generating, for each possible object, an initial candidate prediction for each possible object part from the CCR matrix for the possible object and the CPR matrix for the possible object and the possible object part; and generating, for each possible object and for each possible object part, the probability distribution over possible poses of the possible object part from the initial candidate prediction and the predicted scalar precision corresponding to the possible objet and the possible object part.

Embodiment 6 is the method of embodiment 5, wherein generating, for each possible object and from the object feature vector for the possible object, candidate parameters comprises:

processing the object feature vector for the possible object using a feedforward neural network that is specific to the possible object to generate the candidate parameters.

Embodiment 7 is the method of any one of embodiments 5 or 6, wherein generating, for each possible object and for each possible object part, the probability distribution over possible poses of the possible object part from the initial candidate prediction and the predicted scalar precision corresponding to the possible object and the possible object part comprises:

generating a Normal distribution that has the initial candidate prediction as a mean and the predicted scalar precision as a standard deviation.

Embodiment 8 is the method of any one of embodiments 4-7, wherein the permutation-invariant encoder neural network has a Set Transformer architecture.

Embodiment 9 is the method of any one of embodiments 4-8, wherein generating the object detection output using the probability distributions comprises:

for at least a subset of the possible object parts, assigning the possible object part to the possible object for which the predicted pose for the possible object part is assigned the highest probability in the probability distribution over possible poses of the possible object part given that the possible object part is part of the possible object; and identifying, in the object detection output, the possible object parts that have been assigned to the same possible object.

Embodiment 10 is the method of any one of embodiments 1-9, wherein the object part neural network is trained through unsupervised learning as part of an image autoencoder that autoencodes input images.

Embodiment 11 is the method of embodiment 10, wherein the object detection neural network is trained through unsupervised learning as part of an object part pose autoencoder that autoencodes poses of object parts from input images.

Embodiment 12 is the method of embodiment 11, wherein the object part pose autoencoder and the image encoder are trained jointly.

Embodiment 13 is the method of embodiment 12, wherein, during the training, gradients are backpropagated from the object detection neural network into the object part neural network.

Embodiment 14 is the method of embodiment 13, wherein a stop gradient is applied to all of the inputs to the object part neural network except for the object part feature vectors.

Embodiment 15 is the method of any one of embodiments 12-14, wherein the joint training objective includes one or more terms that impose sparsity constraints.

Embodiment 16 is the method of any one of embodiments 12-15, wherein the joint training objective includes one or more terms that impose entropy constraints.

Embodiment 17 is a system comprising: one or more computers and one or more storage devices storing instructions that are operable, when executed by the one or more computers, to cause the one or more computers to perform the method of any one of embodiments 1 to 16.

Embodiment 18 is a computer storage medium encoded with a computer program, the program comprising instructions that are operable, when executed by data processing apparatus, to cause the data processing apparatus to perform the method of any one of embodiments 1 to 16.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   obtaining an input image;
   processing the input image using an object part neural network to generate predicted part feature data, the predicted part feature data comprising, for each of a plurality of possible object parts:
     a part presence probability representing a likelihood that the possible object part is depicted in the input image,
     a predicted pose of the possible object part in the input image given that the possible object part is depicted in the input image, and
     an object part feature vector characterizing the depiction of the possible object part given that the possible object part is depicted in the input image; and
   processing the predicted part feature data for the plurality of possible object parts using an object detection neural network to generate an object detection output that identifies one or more objects depicted in the input image.

2. The method of claim 1, wherein the object part neural network comprises a convolutional neural network that is configured to process the input image to generate the presence probability, the predicted pose, and the object part feature vector for each of the possible object parts.

3. The method of claim 1, wherein the predicted part feature data further comprises a respective image template for each of the possible object parts that is a low-dimensional image of the possible object part.

4. The method of claim 1, wherein processing the predicted part feature data comprises:
   processing the predicted part feature data using a permutation-invariant encoder neural network to generate predicted object feature data, the predicted object feature data comprising, for each of a plurality of possible objects:
     an object presence probability representing a likelihood that the possible object is depicted in the input image,
     an object feature vector characterizing the depiction of the possible object given that the possible object is depicted in the input image;
     a capsule-camera-relationship (CCR) matrix that represents an affine transformation between the possible object and a camera capturing the image;
   for each possible object, generating, from the predicted object feature data and for each possible object part, a probability distribution over possible poses of the possible object part given that the possible object part is part of the possible object; and
   generating the object detection output using the probability distributions.

5. The method of claim 4, wherein generating, from the predicted object feature data and for each possible object part, a probability distribution over possible poses of the possible object part comprises:
   generating, for each possible object and from the object feature vector for the possible object, candidate parameters that comprise (i) a respective capsule-part-relationship (CPR) matrix for each of the possible object parts that represents an affine transformation between the possible object and the possible object part and (ii) a respective predicted scalar precision for each of the possible object parts;
   generating, for each possible object, an initial candidate prediction for each possible object part from the CCR matrix for the possible object and the CPR matrix for the possible object and the possible object part; and
   generating, for each possible object and for each possible object part, the probability distribution over possible poses of the possible object part from the initial candidate prediction and the predicted scalar precision corresponding to the possible object and the possible object part.

6. The method of claim 5, wherein generating, for each possible object and from the object feature vector for the possible object, candidate parameters comprises:
   processing the object feature vector for the possible object using a feedforward neural network that is specific to the possible object to generate the candidate parameters.

7. The method of claim 5, wherein generating, for each possible object and for each possible object part, the probability distribution over possible poses of the possible object part from the initial candidate prediction and the predicted scalar precision corresponding to the possible object and the possible object part comprises:
   generating a Normal distribution that has the initial candidate prediction as a mean and the predicted scalar precision as a standard deviation.

8. The method of claim 4, wherein the permutation-invariant encoder neural network has a Set Transformer architecture.

9. The method of claim 4, wherein generating the object detection output using the probability distributions comprises:
   for at least a subset of the possible object parts, assigning the possible object part to the possible object for which the predicted pose for the possible object part is assigned the highest probability in the probability distribution over possible poses of the possible object part given that the possible object part is part of the possible object; and
   identifying, in the object detection output, the possible object parts that have been assigned to the same possible object.

10. The method of claim 1, wherein the object part neural network is trained through unsupervised learning as part of an image autoencoder that autoencodes input images.

11. The method of claim 10, wherein the object detection neural network is trained through unsupervised learning as part of an object part pose autoencoder that autoencodes poses of object parts from input images.

12. The method of claim 11, wherein the object part pose autoencoder and the image encoder are trained jointly.

13. The method of claim 12, wherein, during the training, gradients are backpropagated from the object detection neural network into the object part neural network.

14. The method of claim 13, wherein a stop gradient is applied to all of the inputs to the object part neural network except for the object part feature vectors.

15. The method of claim 12, wherein the joint training objective includes one or more terms that impose sparsity constraints.

16. The method of claim 12, wherein the joint training objective includes one or more terms that impose entropy constraints.

17. One or more non-transitory computer-readable storage media encoded with computer program instructions that when executed by one or more computers cause the one or more computers to perform operations comprising:
   obtaining an input image;
   processing the input image using an object part neural network to generate predicted part feature data, the predicted part feature data comprising, for each of a plurality of possible object parts:
      a part presence probability representing a likelihood that the possible object part is depicted in the input image,
      a predicted pose of the possible object part in the input image given that the possible object part is depicted in the input image, and
      an object part feature vector characterizing the depiction of the possible object part given that the possible object part is depicted in the input image; and
   processing the predicted part feature data for the plurality of possible object parts using an object detection neural network to generate an object detection output that identifies one or more objects depicted in the input image.

18. One or more computers and one or more storage devices storing instructions that when executed by one or more computers cause the one or more computers to perform operations comprising:
   obtaining an input image;
   processing the input image using an object part neural network to generate predicted part feature data, the predicted part feature data comprising, for each of a plurality of possible object parts:
      a part presence probability representing a likelihood that the possible object part is depicted in the input image,
      a predicted pose of the possible object part in the input image given that the possible object part is depicted in the input image, and
      an object part feature vector characterizing the depiction of the possible object part given that the possible object part is depicted in the input image; and
   processing the predicted part feature data for the plurality of possible object parts using an object detection neural network to generate an object detection output that identifies one or more objects depicted in the input image.

19. The system of claim 18, wherein the object part neural network comprises a convolutional neural network that is configured to process the input image to generate the presence probability, the predicted pose, and the object part feature vector for each of the possible object parts.

20. The system of claim 18, wherein the predicted part feature data further comprises a respective image template for each of the possible object parts that is a low-dimensional image of the possible object part.

* * * * *